United States Patent
Lavery et al.

(10) Patent No.: US 10,053,861 B2
(45) Date of Patent: Aug. 21, 2018

(54) POWER DISTRIBUTION POST FOR USE IN TIMBER FRAME STRUCTURES

(71) Applicant: Western Timber Frame, Inc., Orem, UT (US)

(72) Inventors: Bradley Jay Lavery, Eagle Mountain, UT (US); Joseph Hyrum Thompson, Eagle Mountain, UT (US)

( * ) Notice: Subject to any disclaimer, the term of this patent is extended or adjusted under 35 U.S.C. 154(b) by 0 days.

(21) Appl. No.: 15/184,955

(22) Filed: Jun. 16, 2016

(65) Prior Publication Data

US 2017/0025836 A1    Jan. 26, 2017

Related U.S. Application Data

(63) Continuation-in-part of application No. 15/058,082, filed on Mar. 1, 2016, now abandoned.

(60) Provisional application No. 62/128,935, filed on Mar. 5, 2015.

(51) Int. Cl.
| | |
|---|---|
| *H02G 3/12* | (2006.01) |
| *E04C 3/42* | (2006.01) |
| *E04C 3/36* | (2006.01) |
| *H02G 3/04* | (2006.01) |
| *E04F 10/00* | (2006.01) |
| *E04C 3/14* | (2006.01) |
| *E04F 10/08* | (2006.01) |
| *E04F 10/06* | (2006.01) |

(52) U.S. Cl.
CPC ............... *E04C 3/42* (2013.01); *E04C 3/145* (2013.01); *E04C 3/36* (2013.01); *E04F 10/00* (2013.01); *E04F 10/08* (2013.01); *H02G 3/0493* (2013.01); *E04F 10/0681* (2013.01)

(58) Field of Classification Search
CPC .. H02G 3/00; H02G 3/02; H02G 3/04; H02G 3/0462; H02G 3/0493; E04C 3/42; E04C 3/145; E04C 3/36; E04C 3/00; E04F 10/00; E04F 10/08; E04F 10/0681
USPC ... 174/502, 50, 68.1, 68.3, 481, 37, 38, 493; 361/600, 641
See application file for complete search history.

(56) References Cited

U.S. PATENT DOCUMENTS

| | | | | |
|---|---|---|---|---|
| 4,015,397 | A * | 4/1977 | Flachbarth | H02G 3/0493 174/493 |
| 6,061,991 | A * | 5/2000 | Dahl | E04F 11/1817 256/21 |
| 7,000,355 | B2 * | 2/2006 | Flory | E06B 1/524 49/365 |
| 7,287,929 | B1 * | 10/2007 | Sokolowski | E01F 9/617 49/49 |
| 7,807,924 | B2 * | 10/2010 | Wurzer | H02G 3/0493 174/37 |
| 7,968,805 | B2 * | 6/2011 | Montgelas | H02G 3/0493 174/481 |
| 8,089,747 | B2 * | 1/2012 | Storck | H02G 3/0493 174/38 |

(Continued)

*Primary Examiner* — Angel R Estrada

(57) ABSTRACT

A kit for a timber frame structure that provides electrical power for lights, fans, and other electrical devices. Pre-wired timber frame components for the kit may comprise support posts, each having a pre-drilled center bore and one or more recessed electrical boxes with weatherproof outdoor covers. Installed in the center bore of each post may be electrical wiring extending to the electrical boxes. The electrical boxes may house switches and outlets that connect to the electrical wiring.

20 Claims, 7 Drawing Sheets

(56) References Cited

U.S. PATENT DOCUMENTS 8,584,401 B2 * 11/2013 Planck .................... E06B 11/02
49/49

* cited by examiner

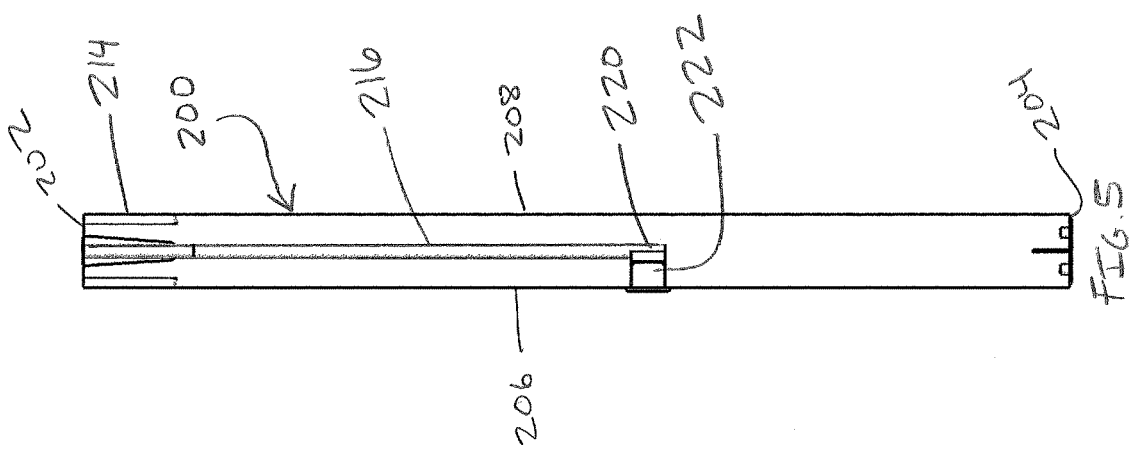
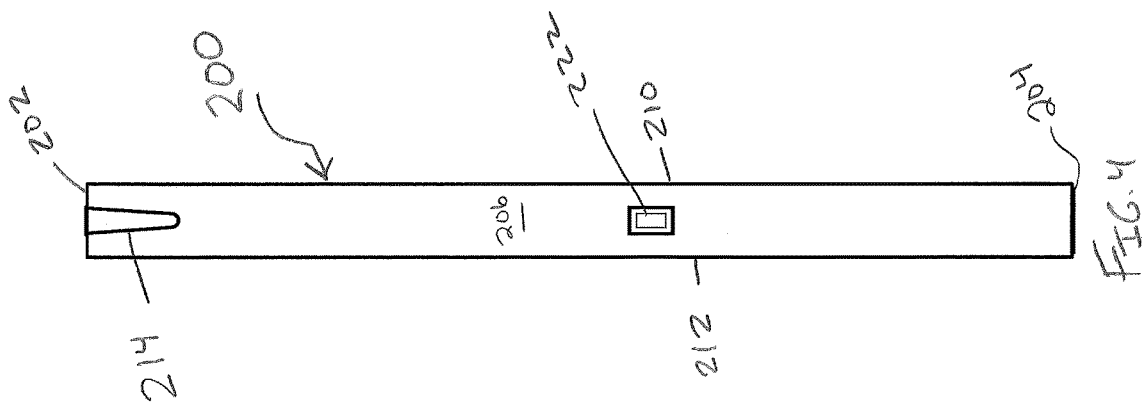

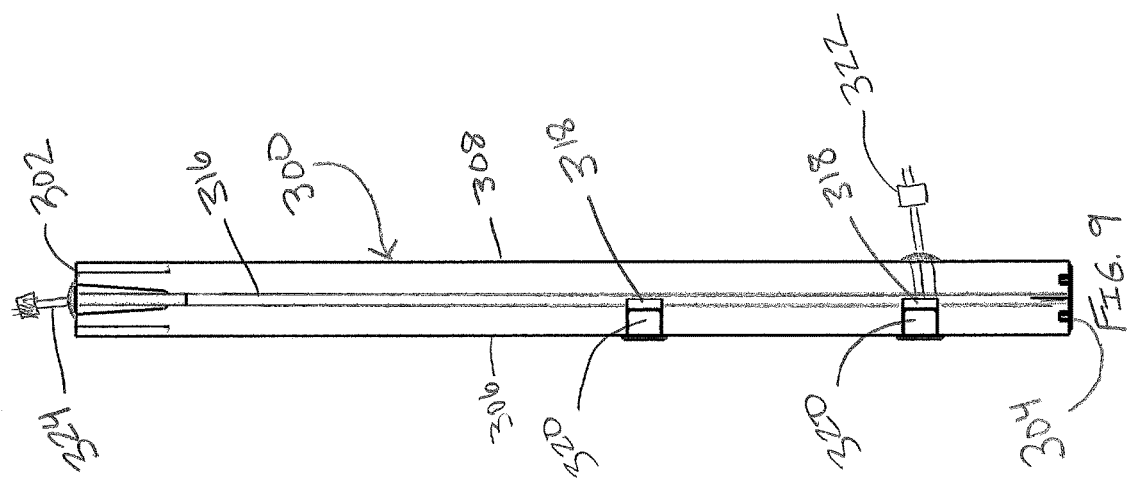
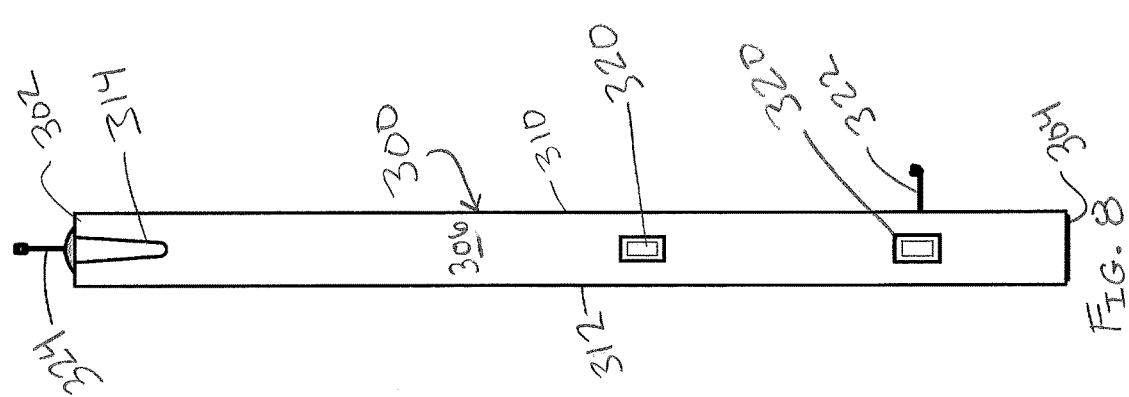

POWER DISTRIBUTION POST FOR USE IN TIMBER FRAME STRUCTURES

CROSS-REFERENCE TO RELATED APPLICATIONS

This application is a continuation-in-part of U.S. patent application Ser. No. 15/058,082 filed on Mar. 1, 2016, which claims the benefit of U.S. Provisional Application Ser. No. 62/128,935 filed on Mar. 5, 2015, which applications are hereby incorporated by reference in their entirety herein.

STATEMENT REGARDING FEDERALLY SPONSORED RESEARCH OR DEVELOPMENT

Not Applicable.

BACKGROUND

1. The Field of the Present Disclosure

The present disclosure relates generally to structures, and more particularly, but not necessarily entirely, to timber frame structures.

2. Description of Related Art

Modern timber frame structures provide structural soundness as well an aesthetically pleasing look. Timber framing can be utilized for both interior framing of residential and commercial buildings and for outdoor-frame structures. More recently, there has been a resurgence in the popularity of outdoor timber frame structures constructed from heavy timbers, including pergolas, pavilions and patio covers. In its most basic form, an outdoor timber frame structure comprises one or more vertical support posts. Horizontal support beams may extend between pairs of the vertical support posts. The horizontal support beams may in turn support a desired roof or covering for providing shade and weather protection. Often times, these outdoor timber frame structures are sold as unassembled kits. These kits include pre-manufactured timber components that may be assembled onsite to form the structure. Timber frame kits have the advantage that they may be assembled easily and quickly without the need of professional help or heavy equipment in most cases.

One drawback to current timber frame structure kits is that it may be difficult or cost prohibitive to run electrical wiring for lighting, fans, power outlets and switches, especially for a lay purchaser. In the past, exposed wiring has been run on the outside of the timber frame structures by the purchasers that resulted in unsafe conditions. In other instances, electrical conduit attached to the outside of the wooden outdoor structures has been utilized. While somewhat safer, electrical conduit creates an unsightly appearance and does not provide an integrated experience. Moreover, because of the size of the timber frame components, most purchasers lack the equipment to properly and safely install electrical wiring. Thus, it would be an improvement over the prior art to provide pre-manufactured timber frame kits for outdoor structures with pre-wired timber components.

The prior art is thus characterized by several disadvantages that are addressed by the present disclosure. The present disclosure minimizes, and in some aspects eliminates, the above-mentioned failures, and other problems, by utilizing the methods and structural features described herein.

The features and advantages of the present disclosure will be set forth in the description which follows, and in part will be apparent from the description, or may be learned by the practice of the present disclosure without undue experimentation. The features and advantages of the present disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which:

FIG. 4 is a front view of a support post pre-configured to provide power distribution to an outdoor timber frame structure;

FIG. 5 is a cross-sectional view of the support post shown in FIG. 4 that is pre-configured to provide power distribution to an outdoor timber frame structure;

FIG. 8 is a front view of a support post pre-configured to provide power distribution to an outdoor timber frame structure;

FIG. 9 is a cross-sectional view of the support post shown in FIG. 8 that is pre-configured to provide power to an outdoor timber frame structure;

DETAILED DESCRIPTION

Figure 1:
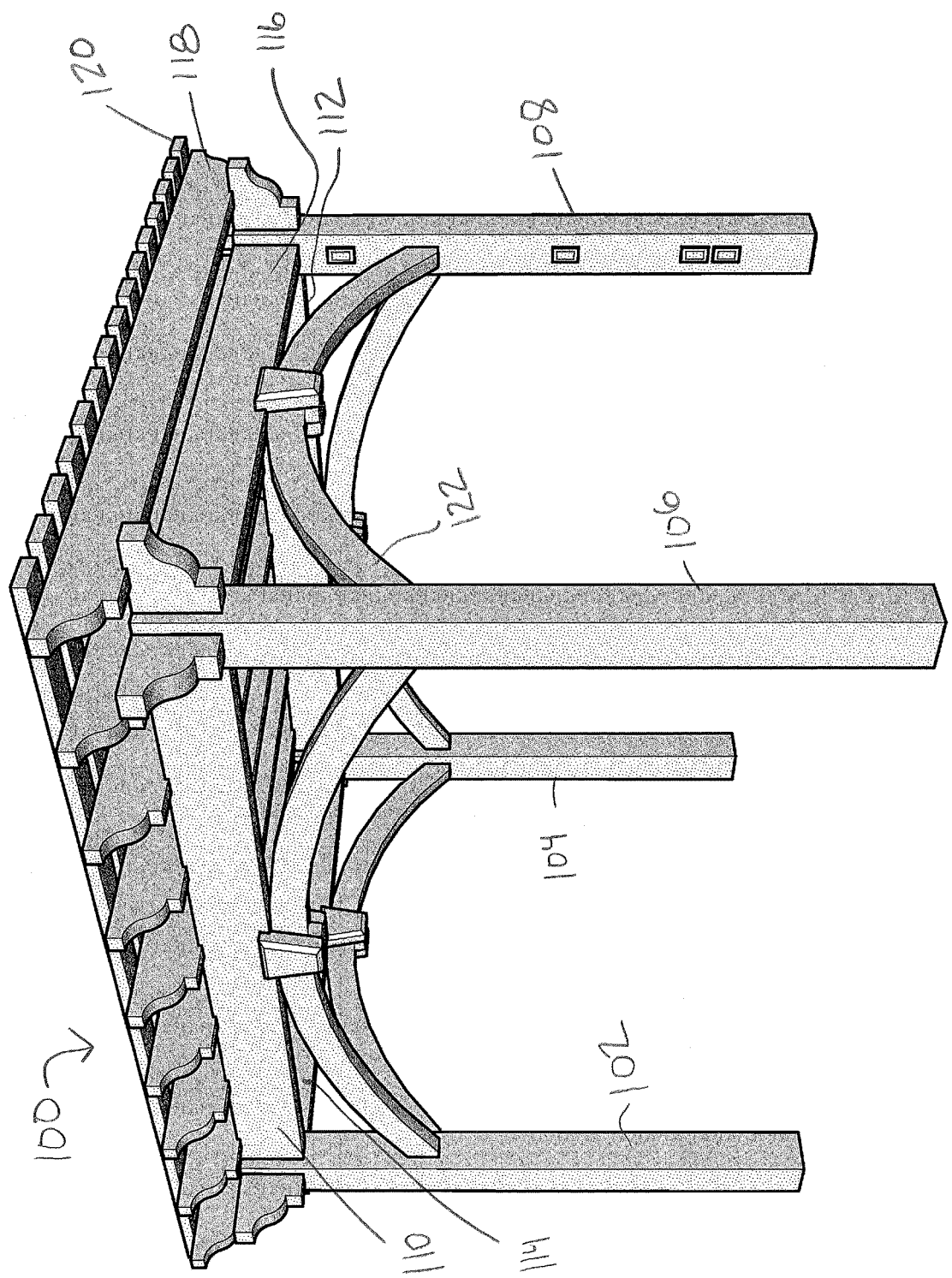
FIG. 1 is a perspective view of an assembled outdoor timber frame structure kit having a support post pre-configured to provide power distribution according to an embodiment of the present disclosure.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

In describing and claiming the present disclosure, the following terminology will be used in accordance with the definitions set out below. As used in this specification and the appended claims, the singular forms "a," "an," and "the" include plural referents unless the context clearly dictates otherwise. As used herein, the terms "comprising," "having," "including," "containing," "characterized by," and grammatical equivalents thereof are inclusive or open-ended terms that do not exclude additional, unrecited elements or method steps.

It is an objective of the present disclosure to provide a pre-wired timber post for use in pre-manufactured kits for timber frame structures. The post may include a bore connected to one or more cutouts in the sidewalls of the post. Electrical boxes may be installed into the cutouts. Electrical wiring may be installed into the bore and connect to electrical components, such as outlets, switches, and plugs, installed in the electrical boxes.

It is a further objective of the present disclosure to provide a pre-manufactured kit for an outdoor timber frame structure having a plurality of support vertical support posts, horizontal beams, and rafters, wherein at least one of the plurality of vertical support posts is pre-wired to provide power distribution to the assembled timber frame structure.

It is still another objective of the present disclosure to provide a pre-wired timber post for use in a timber frame structure, where the post has a male plug for connecting to main power.

It is still another objective of the present disclosure to provide a pre-wired timber post for use in a timber frame structure, wherein the post comprises at least one outlet and a switch for controlling power to the outlet.

It is still another objective of the present disclosure to provide a pre-wired timber post having a male plug for connecting to main power and a female plug for connecting to a male end of a cord of an electrical device, such as a light or fan.

It is still another objective of the present disclosure to provide a pre-wired timber post having a GFI protected plug.

It is still another objective of the present disclosure to provide a pre-wired timber post having a bore and further comprising a steel insert for protecting wiring within the bore from being punctured or damaged from lag bolts during installation.

It is still another objective of the present disclosure to provide a pre-wired timber post having recessed electrical boxes with weather proof covers for plugs and switches that are seamlessly incorporated into the post.

Referring now to FIG. 1, there is depicted an outdoor timber frame structure 100 according to an embodiment of the present disclosure. The structure 100 may comprise a pergola, although it will be appreciated that the structure may comprise other types of outdoor structures, including pavilions, trellises, and arbors. In an embodiment, the structure 100 is pre-manufactured as a kit that is assembled onsite. That is, the structure 100 may be pre-fabricated off site and sold as a kit. The purchaser may either assemble the kit themselves or with the assistance of a professional installation.

In an embodiment, the structure 100 may comprise a plurality of vertical support posts 102, 104, 106, and 108. Extending between the posts 102 and 106 is a front horizontal support beam 110. Extending between the posts 104 and 108 is a rear horizontal support beam 112. Extending between the posts 102 and 104 is a decorative side beam 114. Extending between the posts 106 and 108 is a decorative side beam 116. A plurality of rafters 118 may be disposed on top of the front horizontal support beam 110 and the rear horizontal support beam 112. Disposed on top of the rafters 118 may be a plurality of top planks 120. In an embodiment, the structure 100 may further comprise decorative arches 122 that extend between the posts.

As mentioned above, the components of the structure 100 may be pre-manufactured such that the structure 100 is sold as an unassembled kit. In this regard, the components of the structure 100 may be pre-cut to length from wood, and, in particular, from heavy timber rather than dimensional lumber. But, it will be appreciated that the present disclosure is not limited to heavy timber, and may include any type of pre-cut components formed from wood. The components of the structure 100 may be further configured to connect together using joinery common to the timber frame industry, including, without limitation, mortise and tenon joints or dovetail joints.

Figure 3:
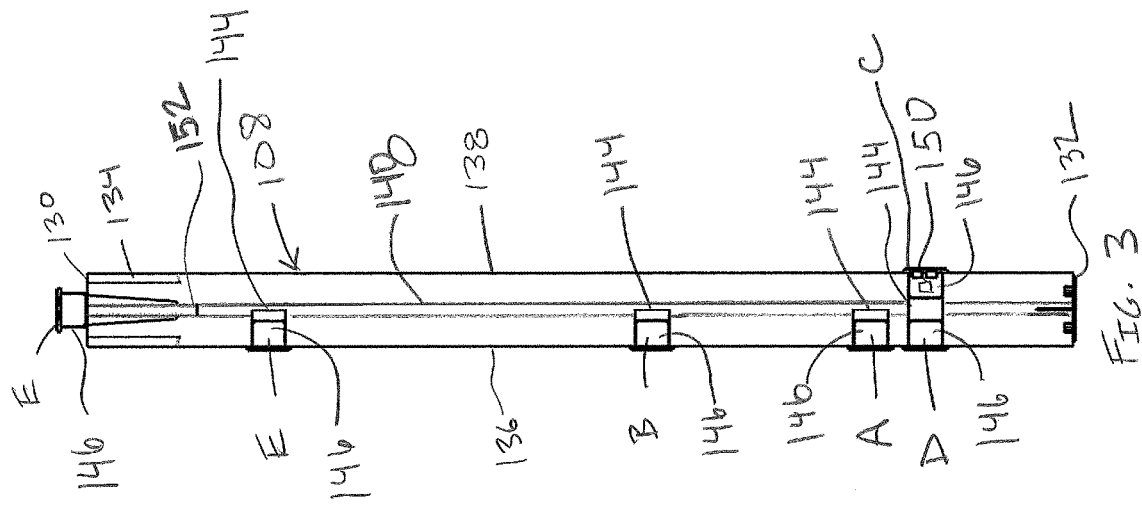
FIG. 3 is a cross-sectional view of the support post shown in FIG. 2 that is pre-configured to provide power distribution to an outdoor timber frame structure.
Figure 2:
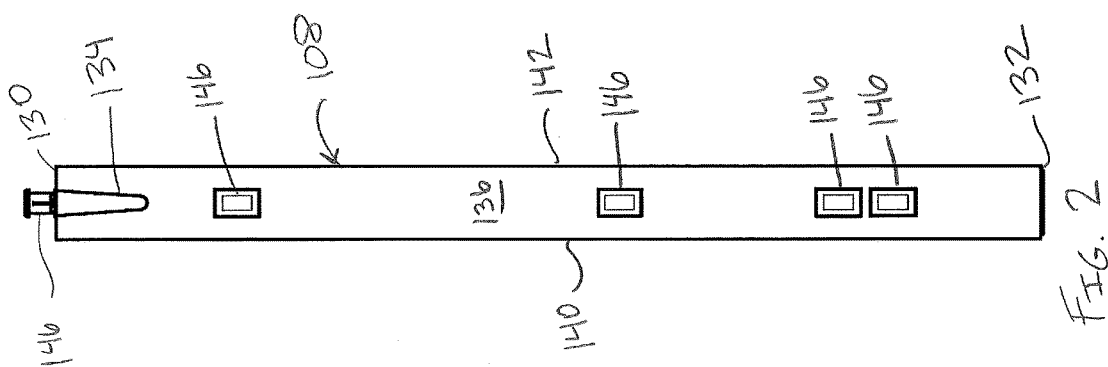
FIG. 2 is a front view of a support post pre-configured to provide power distribution to an outdoor timber frame structure.

In an embodiment, the post 108 is pre-configured to provide power distribution to the structure 100 in the manner that will now be explained. Referring now to FIGS. 3 and 4, the post 108 may extend between a top surface 130 and a bottom surface 132. The post 108 may be four-sided, that is, the post 108 comprises a front surface 136, a rear surface 138, a side surface 140, and a side surface 142. The post 108 may further include a plurality of sockets 134, each of which may form a joint with a horizontal support beam. For example, the sockets 134 may each be configured and adapted to receive a tail (not shown) extending from a horizontal support beam (not shown) to form a dovetail joint. It will be appreciated that other types of joints may be utilized, including mortise and tenon joints.

Extending through an interior of the post 108 is a bore 148. In an embodiment, the bore 148 extends from the top surface 130 to the bottom surface 132. In an embodiment, a steel insert 152 is installed in the top portion of the bore 148 in order to provide a protective shield to wiring inside of the posts. The steel insert 152 protects wiring within the bore 148 from being punctured or damaged from lag bolts or other hardware during installation.

Cutouts or cavities 144 may be formed in the front surface 136 and the rear surface 138 of the post 108. A rear portion of the cutouts 144 may interconnect to the bore 148 in the center of the post 108. Each of the cutouts 144 is configured and adapted to receive an electrical box 146. It will be appreciated that the electrical boxes 146 are typically single-gang boxes but other sizes may be utilized as well. It will be further appreciated that an electrical box 146 may be installed onto the top surface 130 of the post 108. The electrical boxes 146 may be outdoor boxes that include weatherproof covers.

Installed in each of the electrical boxes 146 may be one of a variety of electrical components, including switches, outlets, and plugs. Each of the electrical components in the electrical boxes 146 may be connected to electrical wiring installed in the bore 148 of the post 108. A male plug 150 installed in one of the boxes 146 may be utilized to connect the electrical wiring in the bore 148 to main power. This may be done using an extension cord or other type of wiring with a female plug configured and adapted to receive the male plug 150. When the male plug 150 is connected to main power, the electrical components in the boxes 146 are energized. In an embodiment, main power may be provided from a public electrical grid. In an embodiment, main power may be provided by one or more of solar panels, batteries and a generator.

In an embodiment, one or more of the outlets installed in the electrical boxes 146 is controlled by a switch in another one of the electrical boxes 146. In this manner, a user may plug in the cord of an external electrical device into the outlet on the post 108 that is controlled by a switch on the post 108. For example, the user may plug in a cord of a light or a fan into a controlled outlet in one of the electrical boxes 146 on the post 108. The light or fan may then be controlled by the switch in the other one of the electrical boxes 146 on the post 108. In this manner, the post 108 provides a complete power distribution tree and control points for external electrical devices connected by a user. Other ones of the outlets in the electrical boxes 146 may have a permanent connection to main power.

In an embodiment, one of the outlets in the post 108 may be GFI protected. In particular, ground fault interrupters, of GFIs, are designed to protect from electrical shock by interrupting a household circuit when there is a difference in the currents in the hot and neutral wires. Such a difference indicates that an abnormal diversion of current from the hot wire is occurring. Such a current might be flowing in the ground wire, such as a leakage current from a motor or from capacitors. More importantly, that current diversion may be occurring because a person has come into contact with the hot wire and is being shocked. When a circuit is functioning normally, all the return current from an appliance flows through the neutral wire, so the presence of a difference between hot and neutral currents represents a malfunction— which in some circumstances could produce a dangerous or even lethal shock hazard.

It will be appreciated that the post 108 may be included as part of a pre-manufactured kit for an outdoor timber frame structure. The kit may include the post 108 as well as other posts for providing vertical support for the structure. The kit may further include horizontal support beams as well as rafters and top planks for forming a roof structure. The components of the kits may be pre-cut for easily joinder of the different components. In an embodiment, the outdoor structure is one of a pergola, pavilion and patio cover.

In an embodiment, the post 108 may have multiple configurations of electrical components installed in the electrical boxes. As indicated by the letters and components in the table below, the post 108 may have the configuration shown in FIG. 3.

| Letter | Component |
|--------|-----------|
| A | Female Outlet |
| B | Switch |
| C | Male Plug |
| D | GFCI Outlet |
| E | Switched Outlet |

Referring now to FIGS. 4 and 5, there is depicted a post 200 according to an embodiment of the present disclosure. It will be appreciated that the post 200 may be utilized in a kit similar to the post 108, described above. In an embodiment, the post 200 is pre-configured to provide power distribution to an outdoor timber frame structure in the manner that will now be explained. The post 200 may extend between a top surface 202 and a bottom surface 204. The post 200 may be four-sided, that is, the post 200 comprises a front surface 206, a rear surface 208, a side surface 210, and a side surface 212. The post 200 may further include a plurality of sockets 214, each of which may form a joint with a horizontal support beam. For example, the sockets 214 may be configured and adapted to receive a tail (not shown) extending from a horizontal support beam (not shown) to form a dovetail joint. It will be appreciated that other types of joints may be utilized, including mortise and tenon joints.

A bore 216 may be formed in the interior of the post 200. In particular, the bore 216 may extend from the top surface 202 to about halfway down the post 200. A cutout or cavity 220 may be formed in the front surface 206 of the post 200. An electrical box 222 is installed into the cutout 220. Electrical wiring extends through the bore 216 and to the electrical box 222. A switch or an outlet may be installed in the electrical box 222.

Figure 7:
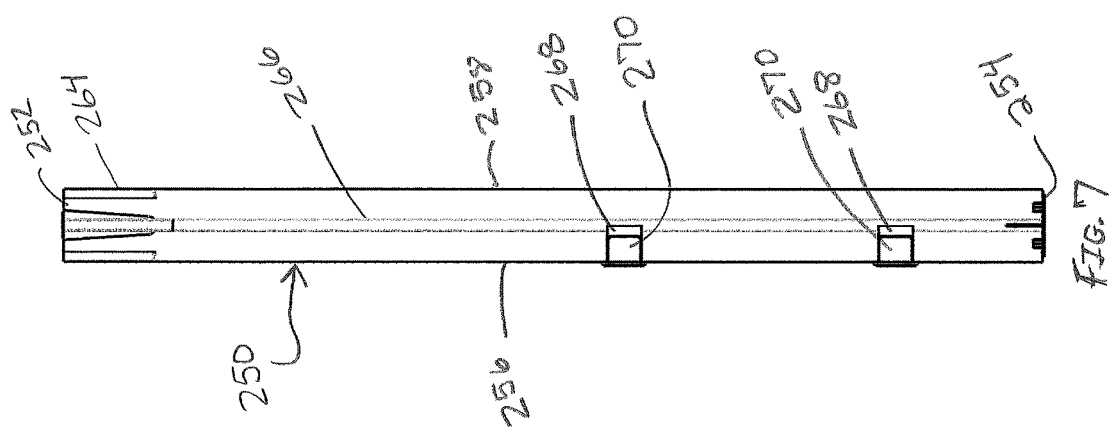
FIG. 7 is a cross-sectional view of the support post shown in FIG. 6 that is pre-configured to provide power distribution to an outdoor timber frame structure.
Figure 6:
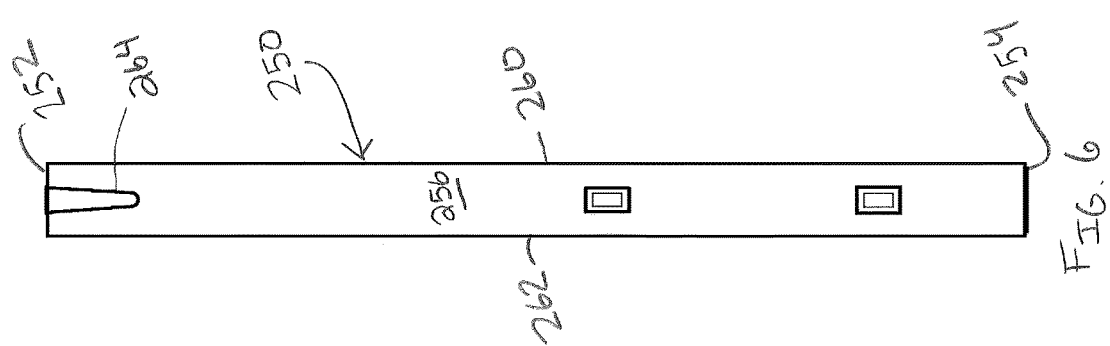
FIG. 6 is a front view of a support post pre-configured to provide power distribution to an outdoor timber frame structure.

Referring now to FIGS. 6 and 7, there is depicted a post 250 according to an embodiment of the present disclosure. In an embodiment, the post 250 is pre-configured to provide power to an outdoor structure similar to post 108, described above. The post 250 may extend between a top surface 252 and a bottom surface 254. The post 250 may be four-sided, that is, the post 250 comprises a front surface 256, a rear surface 258, a side surface 260, and a side surface 262. The post 250 may further include a plurality of sockets 264, each of which may form a joint with a horizontal support beam. For example, the sockets 264 may be configured and adapted to receive a tail (not shown) extending from a horizontal support beam (not shown) to form a dovetail joint. It will be appreciated that other types of joints may be utilized, including mortise and tenon joints.

Extending through an interior of the post 250 is a bore 266. In an embodiment, the bore 266 extends from the top surface 252 to the bottom surface 254. Cutouts 268 may be formed in the front surface 256. A rear portion of the cutouts 268 may interconnect to the bore 266 in the center of the post 250. Each of the cutouts 268 is configured and adapted to receive an electrical box 270. It will be appreciated that the electrical box 270 is typically a single gang box but other sizes may be utilized as well. The electrical boxes 270 may be outdoor boxes that include weatherproof covers. Installed in each of the electrical boxes 270 may be one of a variety of electrical components, including switches, outlets, and plugs. Each of the electrical components in the electrical boxes 270 may be connected to electrical wiring installed in the bore 266 of the post 250.

Referring now to FIGS. 8 and 9, there is depicted a post 300 according to an embodiment of the present disclosure. In an embodiment, the post 300 is pre-configured to provide power to an outdoor structure in the manner that will now be explained. The post 300 may extend between a top surface 302 and a bottom surface 304. The post 300 may be four-sided, that is, the post 300 comprises a front surface 306, a rear surface 308, a side surface 310, and a side surface 312. The post 300 may further include a plurality of sockets 314, each of which may form a joint with a horizontal support beam. For example, the sockets 314 may be configured and adapted to receive a tail (not shown) extending from a horizontal support beam (not shown) to form a dovetail joint. It will be appreciated that other types of joints may be utilized, including mortise and tenon joints.

Extending through an interior of the post 300 is a bore 316. In an embodiment, the bore 316 extends from the top surface 302 to the bottom surface 304. Cutouts 318 may be formed in the front surface 306. A rear portion of the cutouts 318 may interconnect to the bore 316 in the center of the post 300. Each of the cutouts 318 is configured and adapted to receive an electrical box 320. It will be appreciated that the electrical box 320 is typically a single gang box but other sizes may be utilized as well. The electrical boxes 320 may be outdoor boxes that include weatherproof covers.

Installed in each of the electrical boxes 320 may be one of a variety of electrical components, including switches, outlets, and plugs. Each of the electrical components in the electrical boxes 320 may be connected to electrical wiring installed in the bore 316 of the post 300. A male plug 322 may be utilized to connect the electrical wiring in the bore 316 to main power. This may be done using an extension cord or other type of wiring with a female plug configured and adapted to receive the male plug 322. When the male plug 322 is connected to main power, the switches and outlets are energized. A female plug 324 may extend from the top of the bore 316. The female plug 324 may be utilized to provide a connection for electrical devices, such as lights and fans.

Figure 11:
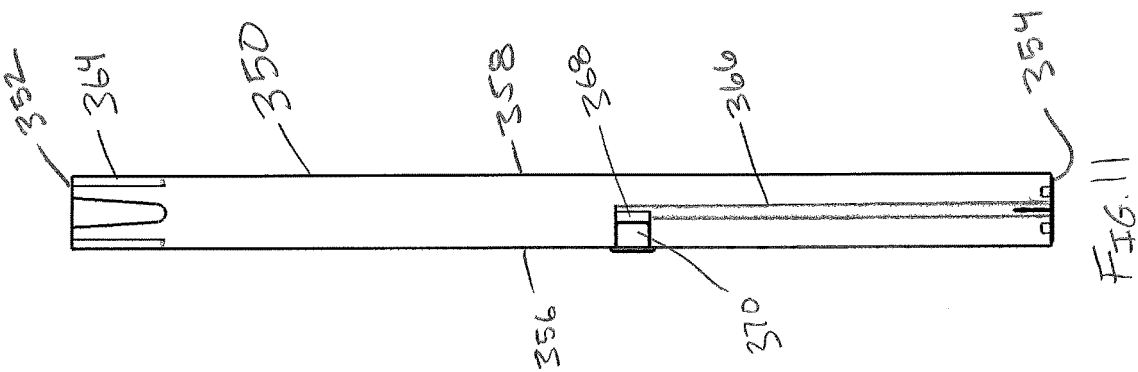
FIG. 11 is a cross-sectional view of the support post shown in FIG. 10 that is pre-configured to provide power distribution to an outdoor timber frame structure.
Figure 10:
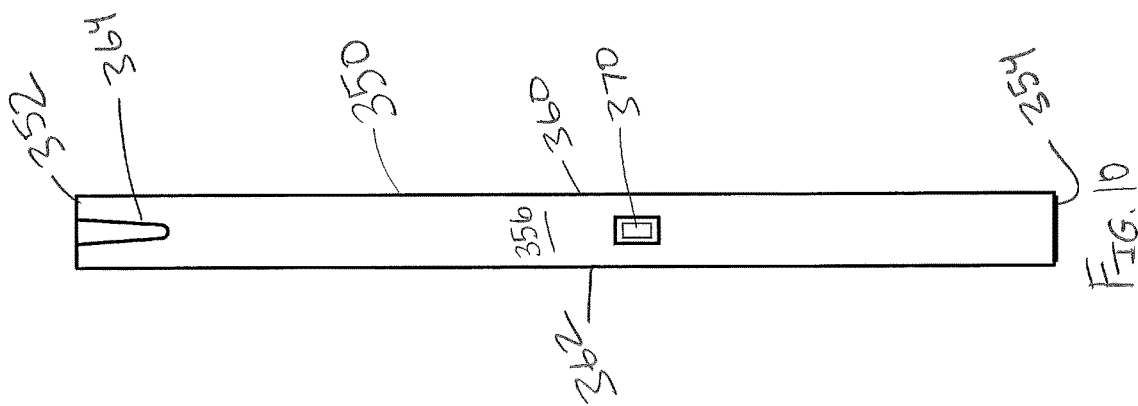
FIG. 10 is a front view of a support post pre-configured to provide power distribution to an outdoor timber frame structure.

Referring now to FIGS. 10 and 11, there is depicted a post 350 according to an embodiment of the present disclosure. In an embodiment, the post 350 is pre-configured to provide power to an outdoor structure in the manner that will now be explained. The post 350 may extend between a top surface 352 and a bottom surface 354. The post 350 may be four-sided, that is, the post 350 comprises a front surface 356, a rear surface 358, a side surface 360, and a side surface 362. The post 350 may further include a plurality of sockets 364, each of which may form a joint with a horizontal support beam. For example, the sockets 364 may be configured and adapted to receive a tail (not shown) extending from a horizontal support beam (not shown) to form a dovetail joint. It will be appreciated that other types of joints may be utilized, including mortise and tenon joints.

Extending through an interior of the post 350 is a bore 366. In an embodiment, the bore 316 extends from the bottom surface 354 to about halfway up the post 350. A cutout 368 may be formed in the front surface 356. A rear portion of the cutout 368 may interconnect to the bore 366 in the center of the post 350. The cutout 368 is configured and adapted to receive an electrical box 370. It will be appreciated that the electrical box 370 is typically a single gang box but other sizes may be utilized as well. The electrical box 370 may be an outdoor box that includes a weatherproof cover.

Installed in the electrical box 370 may be one of a variety of electrical components, including switches, outlets, and plugs. The electrical component in the electrical box 370 may be connected to electrical wiring installed in the bore 366 of the post 350.

Figure 12:
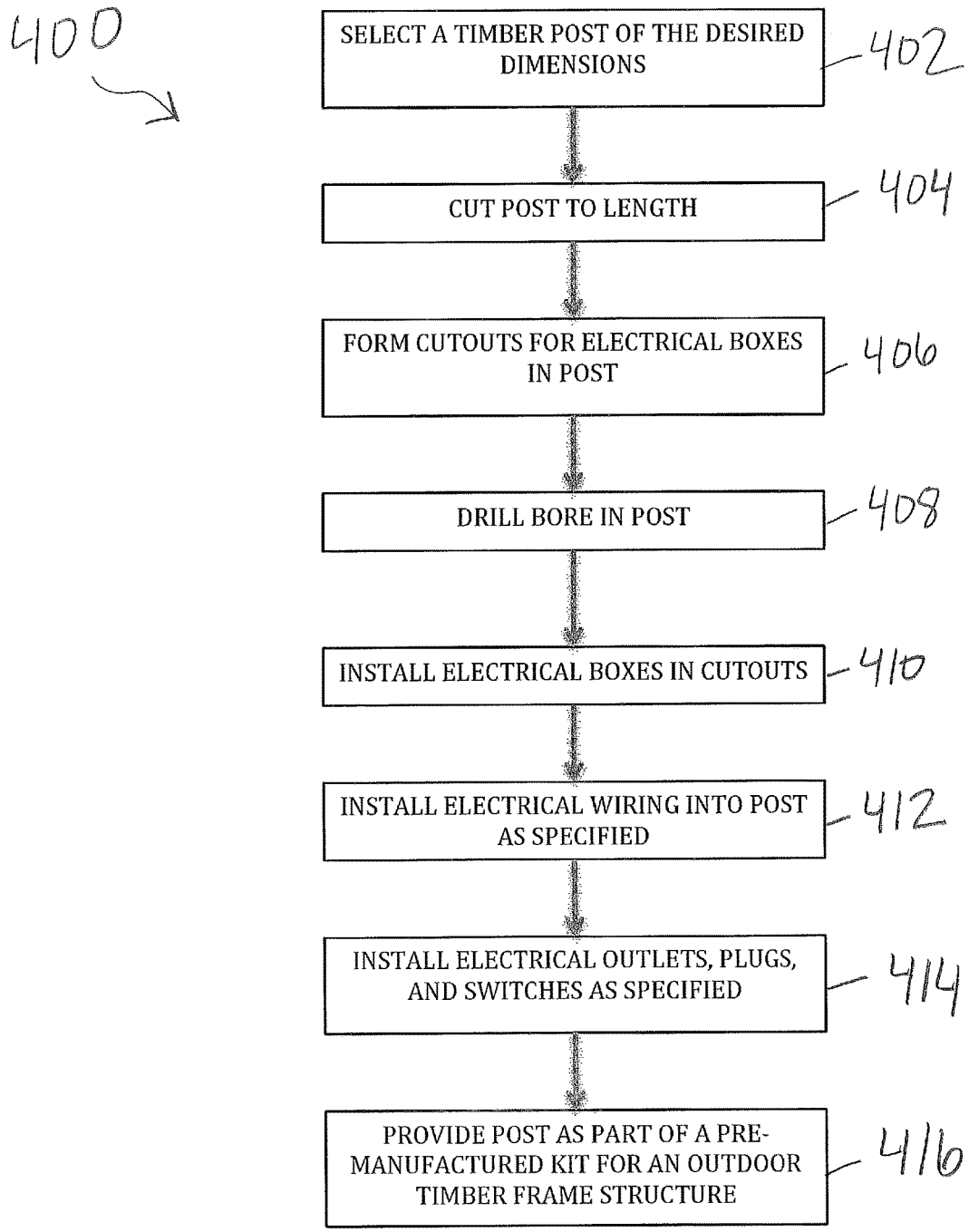
FIG. 12 is a flow chart of a process for fabricating a pre-configured post for use in providing a power distribution point for a timber frame structure kit.

Referring now to FIG. 12, a process 400 for fabricating a pre-wired post for use in a timber frame structure kit according to an embodiment of the present disclosure is described. At step 402, a timber post of the desired size is selected. In an embodiment, the post is one of 6×6 inches, 8×8 inches, 10×10 inches, and 12×12 inches. In an embodiment, a length of the post is between six feet and twelve feet. At step 404, the post is cut to length and a joint component, such as a socket, is formed in the post. At step 406, the position of one or more cutouts is located on the post and the cutouts are then cut. This may be accomplished using a chain mortiser. At step 408, a bore is drilled along a longitudinal axis of the post to the desired length. In an embodiment, the bore extends along the entire length of the post. In an embodiment, the bore extends from an end of the post to about halfway through the post. A steel insert may optionally be installed into the bore. At step 410, electrical boxes are secured into the cutouts formed in the post. At step 412, the appropriate electrical wiring is installed into the bore and connected to the electrical boxes. It will be appreciated that the electrical wiring is determined by the desired electrical components to be installed into the electrical boxes. At step 414, the electrical components, such as switches, outlets and plugs are installed into the electrical boxes. At step 416, the post is included as part of a pre-manufactured kit for an outdoor timber frame structure.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. An apparatus for providing electrical power for a wooden outdoor structure, said wooden outdoor structure having a horizontal support beam, said apparatus comprising:
   a timber post extending along a longitudinal axis from a first end to a second end;
   a bore formed in the interior of the timber post;
   a first cutout formed in a sidewall of the timber post, said first cutout in communication with said bore;
   a first electrical box installed in the cutout;
   electrical wiring installed in the bore of the post and extending to the first electrical box; and
   a joint member formed in the timber post, wherein said joint member is operable to secure the timber post to the horizontal support beam.

2. The apparatus of claim 1, further comprising an electrical outlet installed in the first electrical box, wherein said electrical outlet is connected to said electrical wiring.

3. The apparatus of claim 1, further comprising a male plug connected to said electrical wiring, wherein said male plug is configured and adapted to connect to main power.

4. The apparatus of claim 3, wherein the male plug is housed in said first electrical box.

5. The apparatus of claim 1, wherein the joint member is a socket configured and adapted to receive a tail extending from said horizontal support beam.

6. The apparatus of claim 1, further comprising a second electrical box installed into a second cutout formed in the post.

7. The apparatus of claim 6, wherein the first electrical box comprises an outlet and the second electrical box comprises a switch, wherein said switch controls power to said outlet.

8. The apparatus of claim 1, further comprising a GFI outlet installed in said first electrical box.

9. A kit for building an outdoor timber frame structure, said kit comprising:
   a plurality of timber posts;
   a plurality of timber beams;

wherein the timber beams and the timber posts are configured and adapted to interlock together to form a timber frame;

wherein at least one of the timber posts is pre-wired with an electrical circuit and an electrical connector for connecting the circuit to main power.

10. The kit of claim 9, further comprising a plurality of rafters, wherein the plurality of rafters are configured to extend horizontally between a pair of the plurality of timber beams.

11. The kit of claim 10, further comprising a plurality of top planks configured and adapted to extend across one or more rafters.

12. The kit of claim 9, wherein the outdoor timber frame structure is one of a pergola and a pavilion.

13. The kit of claim 9, wherein the pre-wired timber post further comprises a male plug, wherein said male plug is configured and adapted to connect to main power.

14. The kit of claim 13, wherein the male plug is housed in an electrical box installed in said pre-wired timber post.

15. The kit of claim 9, further comprising a plurality of electrical boxes installed in said timber post, wherein a first one of the plurality of electrical boxes comprises a switch and a second one of the plurality of electrical boxes comprises an outlet controlled by said switch.

16. The kit of claim 9, further comprising a GFI outlet installed in one of the plurality of electrical boxes.

17. A method of pre-wiring a timber post for use in a kit to build an outdoor timber frame structure, said method comprising:
    selecting a timber post;
    cutting the timber post to length;
    forming a first cutout in the timber post;
    drilling a bore in the timber post;
    installing an electrical box in the first cutout in the timber post;
    installing electrical wiring into the post, said electrical wiring having an electrical connector for connecting to main power;
    installing an outlet in said electrical box and connect it to the electrical wiring; and
    providing the timber post as part of a pre-manufactured kit for an outdoor timber frame structure.

18. The method of claim 17, further comprising forming a second cutout in the timber post and installing an electrical box in said second cutout and installing a switch in said second cutout.

19. The method of claim 17, wherein the electrical connector comprises a male plug.

20. The method of claim 17, wherein the outdoor timber frame structure is one of a pavilion, pergola, and patio cover.

* * * * *